C. HICKTON.
MACHINE OUTPUT INDICATING DEVICE.
APPLICATION FILED JAN. 20, 1910.

1,013,389.

Patented Jan. 2, 1912.
7 SHEETS—SHEET 1.

Fig.1.

C. HICKTON.
MACHINE OUTPUT INDICATING DEVICE.
APPLICATION FILED JAN. 20, 1910.

1,013,389.

Patented Jan. 2, 1912.
7 SHEETS—SHEET 3.

Fig. 4.

C. HICKTON.
MACHINE OUTPUT INDICATING DEVICE.
APPLICATION FILED JAN. 20, 1910.

1,013,389.

Patented Jan. 2, 1912.

Attest
Edward N. Sarton
Ewd L. Tolson

Inventor
Charles Hickton
by Spear, Middleton, Donaldson & Spear
Attys

UNITED STATES PATENT OFFICE.

CHARLES HICKTON, OF LONG EATON, ENGLAND, ASSIGNOR OF ONE-HALF TO WILLIAM PARNHAM SMITH AND ONE-HALF TO JOHN PATRICK NEWTON, OF LONG EATON, ENGLAND.

MACHINE-OUTPUT-INDICATING DEVICE.

1,013,389.  Specification of Letters Patent.  Patented Jan. 2, 1912.

Application filed January 20, 1910. Serial No. 539,129.

*To all whom it may concern:*

Be it known that I, CHARLES HICKTON, a subject of the King of Great Britain and Ireland, and residing at Carfield avenue, Long Eaton, in the county of Derby, England, have invented certain new and useful Improvements Relating to Machine-Output-Indicating Devices, of which the following is a specification.

My invention relates to machine-output indicating devices and especially to machines for producing laces of various kinds.

In machines for making lace, for example, measuring devices are employed which indicate the quantity of material made on the machine such devices frequently taking the form of a series of ratchet wheels provided with spring pressed pawls, which prevent backward rotation. The first wheel of the train is moved by some appropriate mechanism at each motion of the machine, each rotation of this wheel causing the second wheel to move around, say, one tooth; the second wheel in turn similarly actuates the third wheel which is usually marked to indicate the length of material being produced upon the machine. The third wheel of the train is usually set to zero at the beginning of a piece of work by the operator and at any time therefore, this wheel indicates the number of racks of work made upon the machine in connection with the particular piece of material under manufacture. Such mechanism as above indicated is generally exposed and can be tampered with by the operator, who is paid by the number of racks made in a given time, whatever the length of lace may be per rack.

The primary object of the present invention is to enable a record to be obtained of the output in racks of each machine and also a record of the running and idle time of the machine.

A further object of the invention is to construct and arrange the measuring mechanism in such a way that it cannot be tampered with without detection, the final wheel being preferably still capable of being set to zero as required by the operator.

To these ends the invention consists in the novel features hereinafter described and particularly pointed out in the claims.

Referring to the accompanying drawings which illustrate one embodiment of the invention.

The same reference symbols are employed to denote corresponding parts in the different figures.

Figure 1:
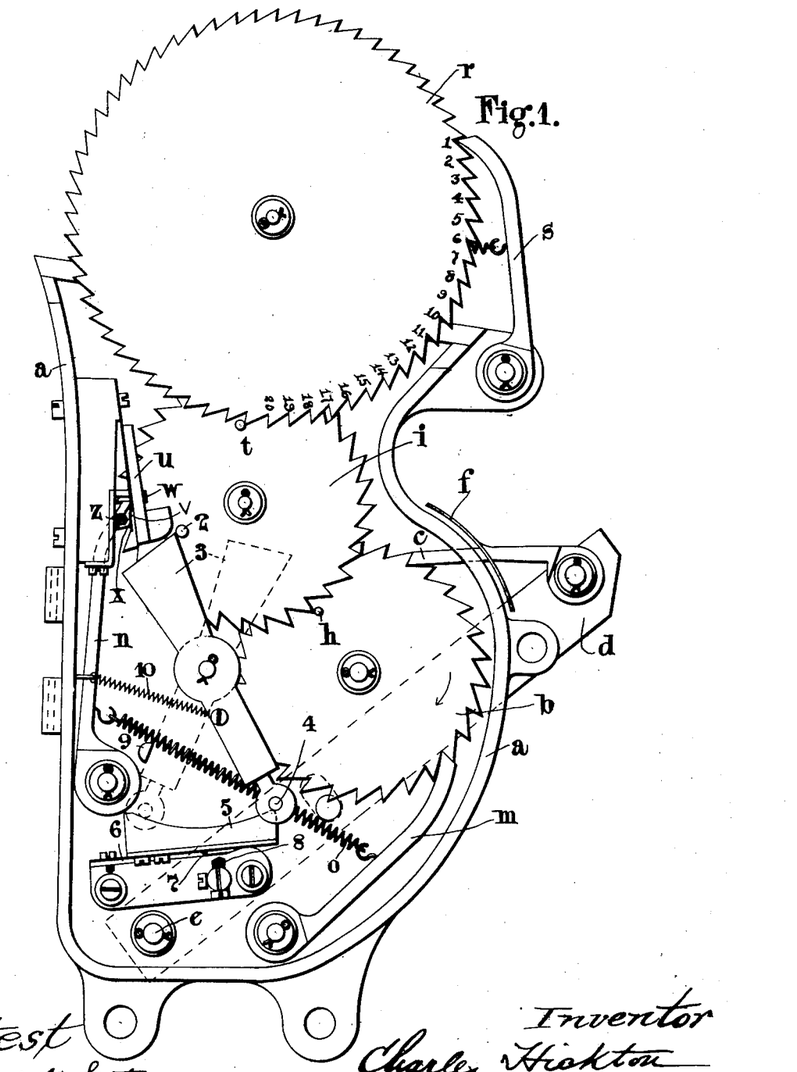
—Figure 1 shows a front view of the measuring apparatus attached to the machine and operated by any convenient working part.

I will now describe one form of my invention by way of example, and will take in order the different units, namely measuring mechanism, belt lever switch and recording instrument, which together constitute the complete installation. Referring for this purpose to Fig. 1, the measuring mechanism is inclosed in a case, $a$, adapted to be fixed by any suitable means to the framework of the machine. In the figure the lid or door is removed in order to show the mechanism within the casing, but is is proposed that such a lid or door should be hinged at one side and padlocked or otherwise secured when closed, so that the mechanism cannot be tampered with, a glass window preferably being provided in the lid for observation purposes.

Turning now to the measuring mechanism itself, this consists in a ratchet wheel, $b$, operated by a pawl, $c$, pivoted on a lever, $d$, in turn pivoted to the casing at the point $e$. The lever, $d$, is connected by any suitable means to a convenient part of the lace-working or other machine so as to be reciprocated at each working stroke. To prevent access to the inside of the casing, the pawl, c, is provided with a shield, f, to cover the aperture through which it passes. A pin, h, on the first ratchet wheel, b, at every revolution of the latter takes into the teeth of a similar ratchet wheel, i, rotating it through a certain distance. Backward motion of these ratchet wheels is prevented by pivoted pawls, m and n, which may conveniently be linked together, as shown, by a spring, o.

The measuring mechanism proper is completed by a third wheel, r provided with a spring controlled pawl, s, this third wheel lying for the most part outside the casing so that its indications can be readily read off by the operator, and its position set to zero when required. This wheel, r, is operated from the second wheel in a similar way to that in which the latter is operated from the first wheel, namely by a pin, t, which takes into the teeth of the third wheel at each revolution of the second.

In order that a record may be obtained both of the number of racks or work done and also of the idle and running time of the machine, I arrange for certain switches to be operated in the following manner: In the first place I provide a switch, u, supported by a spring, v, which normally presses it against the insulated stop, w. This switch itself carries a light spring, x, which makes contact with the pin, z, when an insulated pin, 2, on the second ratchet wheel comes into operative engagement with the switch at each revolution. This pin, 2, on the second ratchet wheel also operates a spring-controlled trip-lever or tumbler, 3, carrying a downwardly projecting pin, 4, which in its center position serves to swing a second switch, 5, about the spring, 6, which supports it, and to cause the light spring, 7, attached to it to make contact with the terminal, 8. A stop, 9, is provided to limit the motion of the tumbler in one direction, while the switch, 5, is provided with a member, the periphery of which is so curved as shown at 10, that the pin, 4, on the tumbler when at the ends of its travel allows the switch under the influence of the spring, 6, which supports it, to break contact between the light spring, 7, and the terminal 8, but cause contact to be made when in about its central position. The object of this part of the mechanism is to cause a momentary current to be sent to the recording apparatus, at each revolution of the second wheel corresponding to one rack of work, is being necessary as will be hereinafter described that to enable the current to be sent, each of the light spring switches x and 7, must be in contact with its corresponding terminal.

Figure 2:
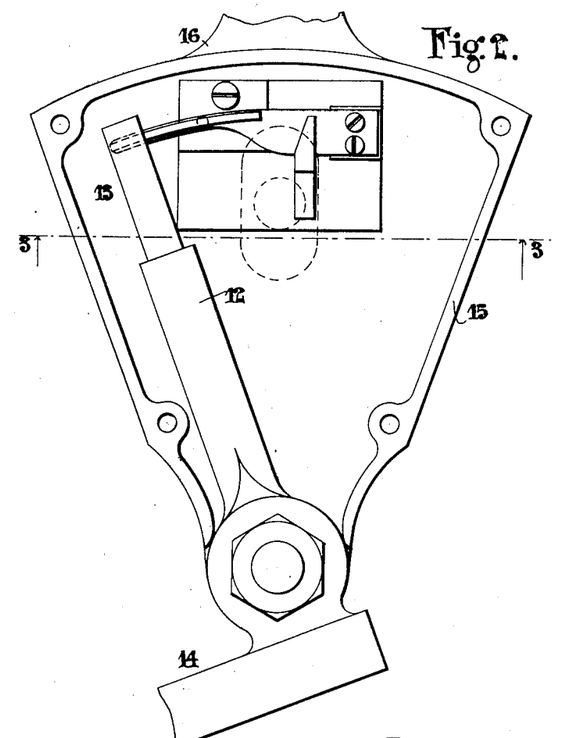
Fig. 2 shows a front view of the belt lever switch.
Figure 3:
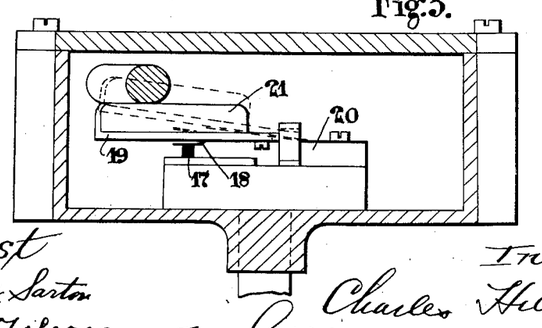
Fig. 3 being a detail section of the same on the line 3—3 of Fig. 2.
Figure 4:
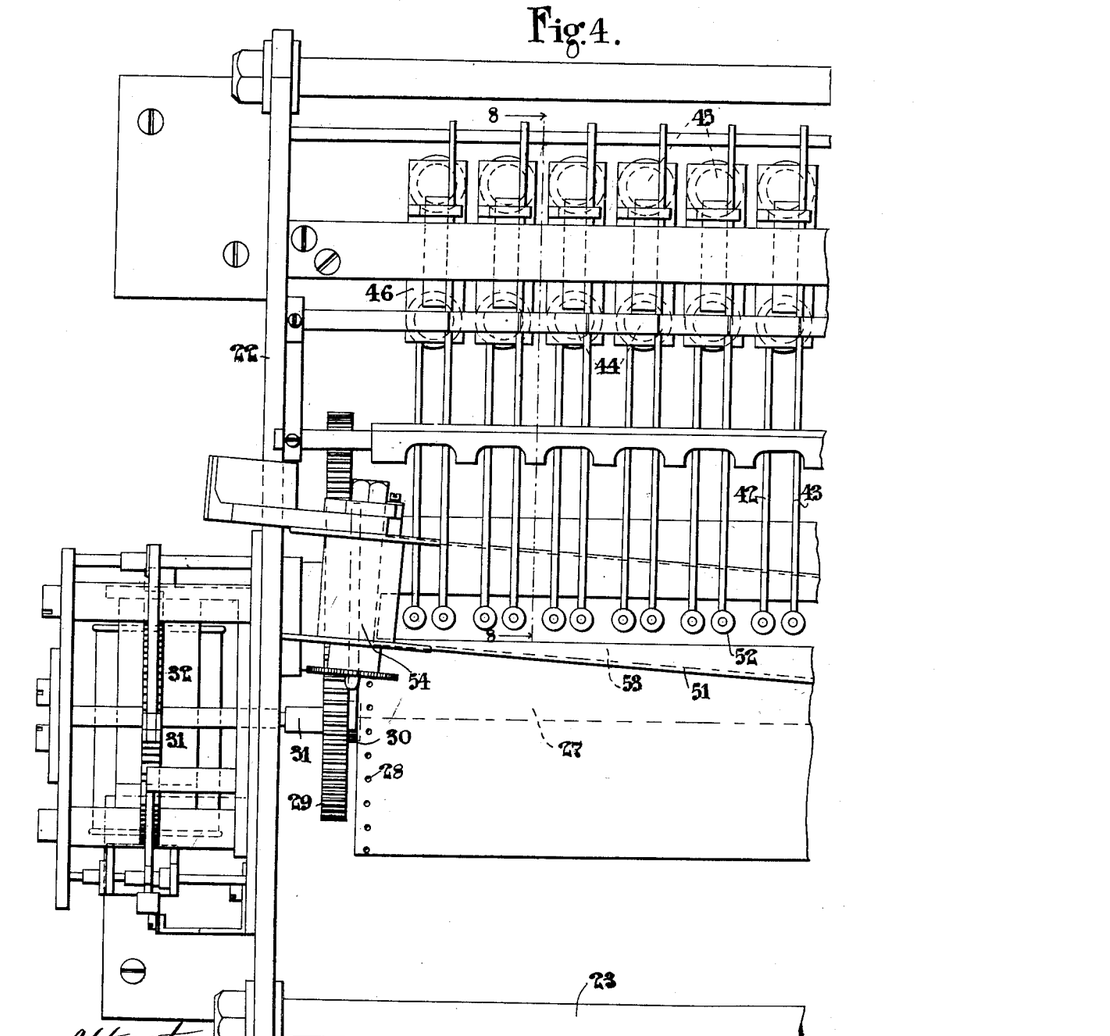
Figs. 4 and 4ª show a plan of the recording apparatus for a number of different machines.
Figure 4A:
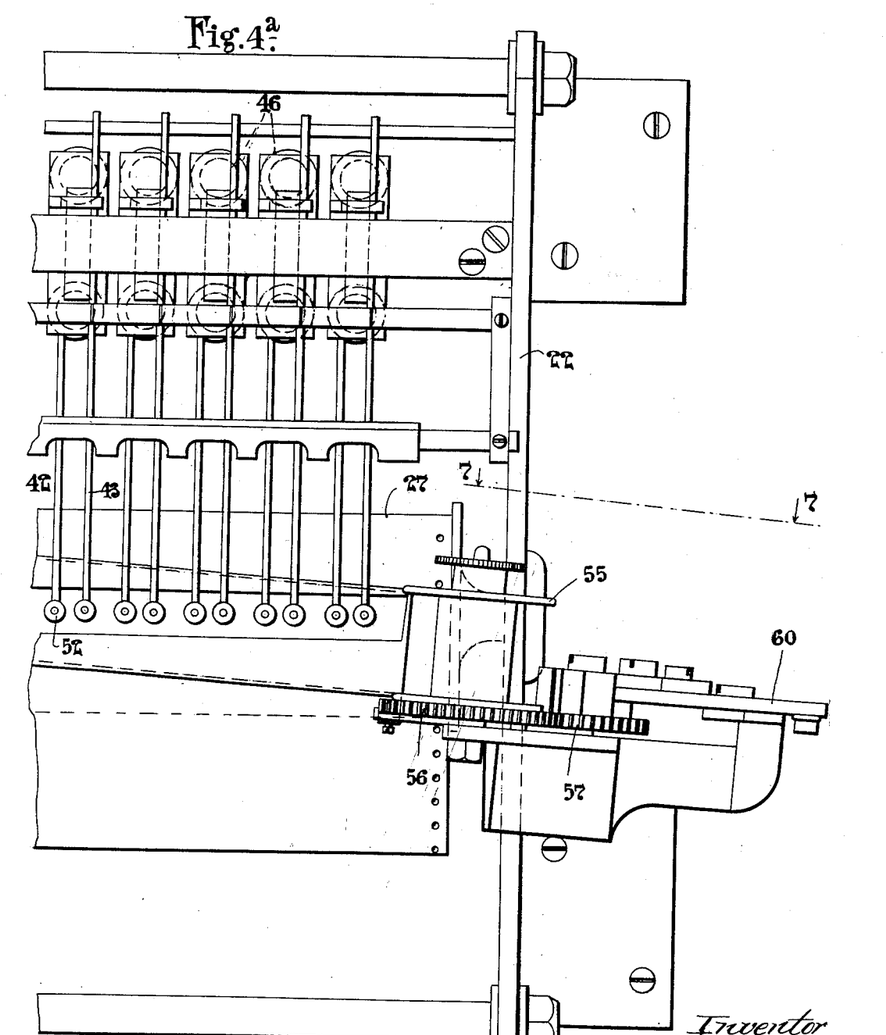
Figure 5:
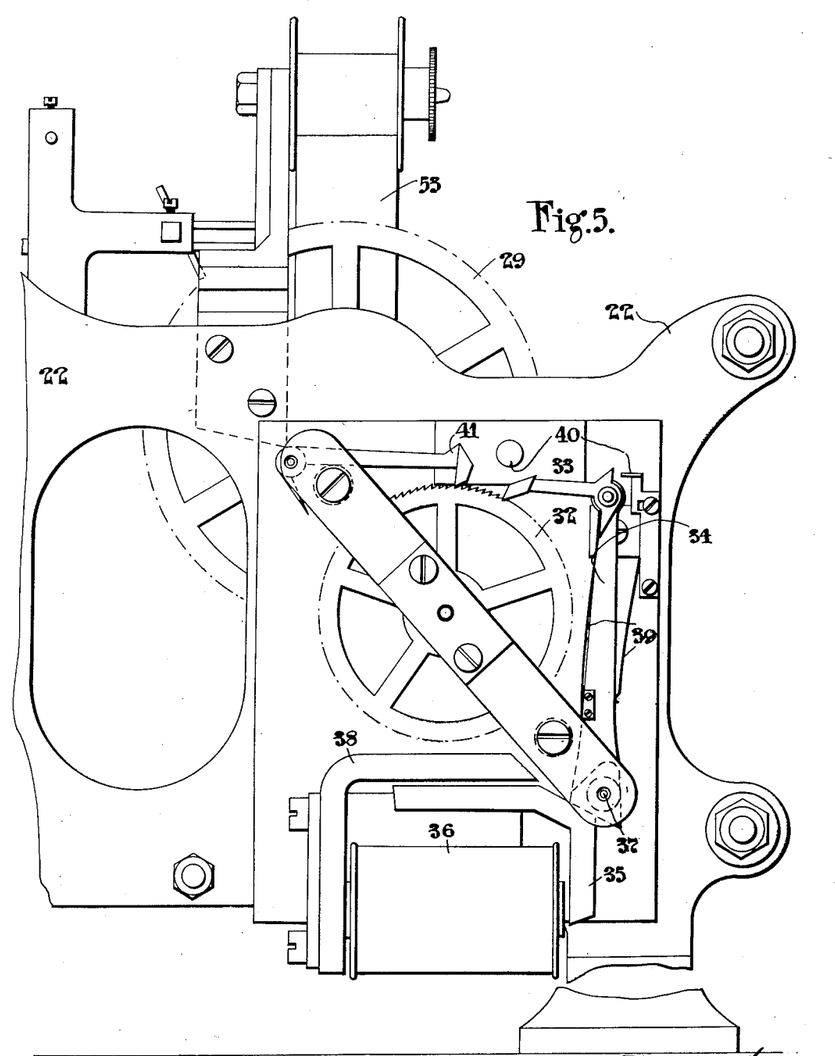
Fig. 5 being an end view of the same looking on its left-hand end and showing in particular the electrically operated mechanism for intermittently rotating the recording drum, and Fig. 6 being an end view of the same apparatus looking on its right-hand end and showing in particular the automatic ribbon feeding mechanism connected to the hinged door of the case in which the recording instrument is inclosed.
Figure 6:
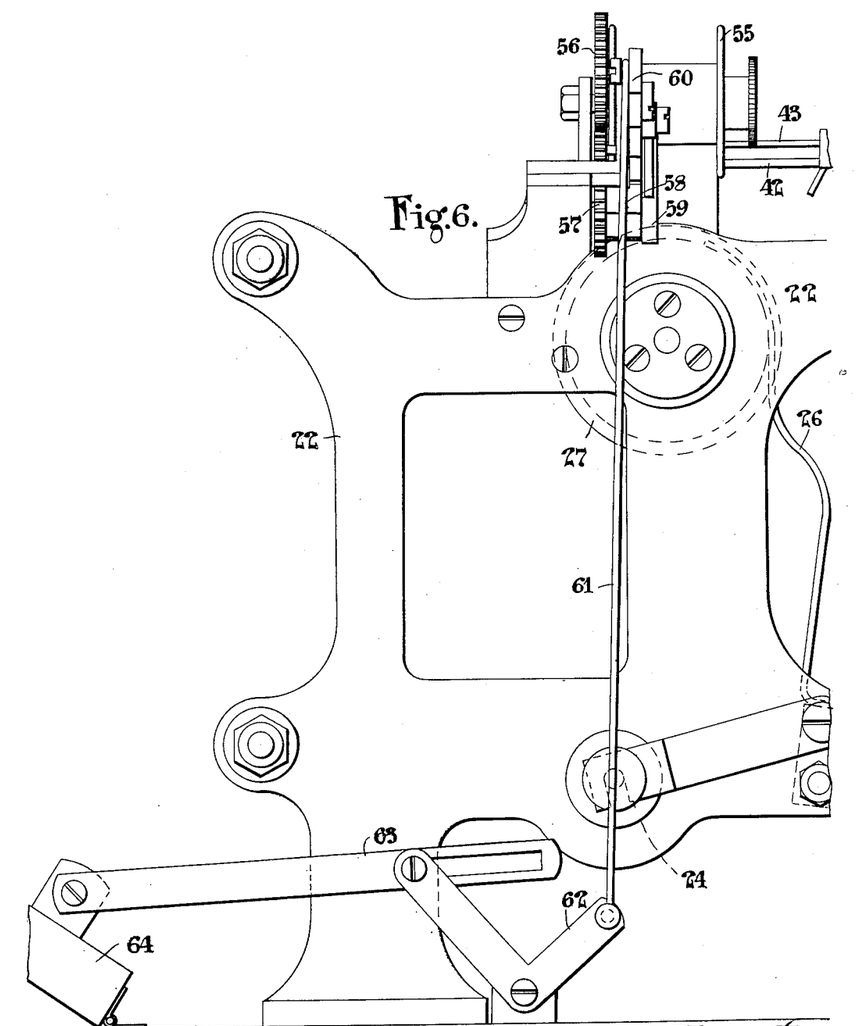

The action of the mechanism is as follows:—The insulated pin, 2, on the second wheel moving in the direction shown by the arrow, causes the tumbler to move over from the position shown in dotted lines to that shown in full lines. It will be seen that in this position the tail or upper end of the tumbler is in close contact with the adjacent part of the switch, u, so that momentarily the pin, 2 is in contact with both members, thereby completing a circuit between the light spring, x, and the terminal, z. This contact is still maintained as the pin, 2, passes clear of the tumbler which is immediately pulled over against the stop, 9, by the spring, 10, causing at about the center of its motion momentary contact to be made between the light spring and the terminal. Since the two switches, u and 5, are in series, a path is thus provided for an instant for the current to pass to the recording apparatus. Shortly after the tumbler has moved back under the influence of the spring, 11, the insulated pin, 2, will clear the switch, u, which thereupon returns to its position in contact with the insulated stop. Passing now to the second unit of the complete installation namely, the belt lever switch H (see Figs. 2, 3 and 9) this may consist of an arm, 12, having a rod, 13, of insulated material projecting from its end and rigidly connected with a bracket, 14, or the like which can be fixed to any convenient part of the machine. A sector-shaped casing, 15, is mounted on the lever, 16, which moves the belt from the fixed to the loose pulley or vice versa so as to stop or start the machine. The casing carries a switch consisting of a fixed terminal, 17, and a light spring, 18, carried on an arm, 19, and normally held in position to open the circuit by the supporting spring, 20. The switch arm, 19, carries a raised member, 21, which as the lever is thrown over to start the machine, comes into contact with the insulated rod, and closes the circuit. It will be obvious that this switch may be operated from any other part of the machine which has one position when the machine is working and another position when stopped.

The electrical connections between the measuring mechanism, the belt lever switch, and recording instrument, will be described hereinafter.

I will now describe the recording instrument itself, with reference to Figs. 4 to 8. The instrument consists of two frames or standards, 22, connected by suitable ties, 23, and carrying between them a drum, 24, from which the record chart is drawn. The chart passes from this drum, beneath suitable spring clips, 26, to a second drum, 27, driven by clockwork, this second drum being provided with pins, 28, at its extremities taking into corresponding holes punched along the edges of the chart. The driving drum, 27, carries on its axis a spur wheel, 29, which is driven by a pinion, 30, mounted on the clock spindle, 31, which in turn carries a ratchet wheel, 32, fed intermittently forward by the pawl, 33, pivotally mounted on the end of the lever, 34. This lever is carried by the armature, 35, of the driving magnet, 36, lever and armature together being pivotally mounted on the spindle, 37, the magnetic circuit being completed by the right angled bend, 38, forming part of the armature.

Figure 8:
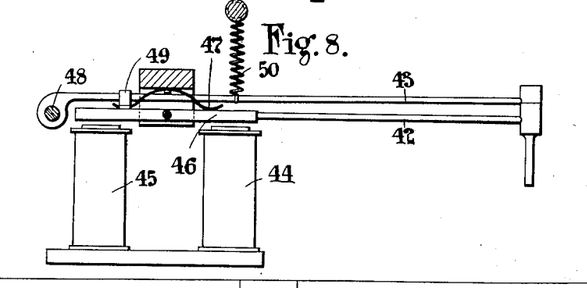
Fig. 8 shows a detail side elevation of the hammer operating mechanism and magnets for one machine viewed as indicated by the arrows from the line 8—8 of Fig. 4, while finally

Suitable springs, 39, are provided to control the motion of the operating pawl, 33, and stops, 40, to limit its motion. A second pawl, 41, is also provided to prevent return of the ratchet wheel. Above the recording drum are arranged a series of hammers, 42 and 43, two to each lace-making machine, these hammers being operated respectively by electromagnets, 44 and 45, arranged at the back of the machine in pairs one behind the other. Above each pair of magnets is arranged an armature, 46, pivoted at its center point, and held in its neutral position by a suitable spring, 47, its ends being disposed respectively in operative relationship to the magnets. One of the hammers for each lace making machine is carried directly by the armature, as shown in Fig. 8, while the other, preferably arranged in close proximity to the first, is pivoted at its rear end to the bar, 48, and by means of a pin, 49, on the armature is drawn down when the proper magnet is energized, a light spring, 50, serving to withdraw this hammer after it has made its operative stroke.

Figure 7:
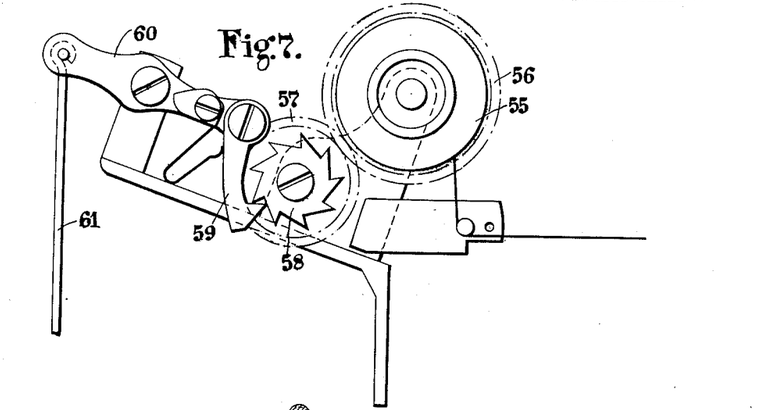
Fig. 7 shows a detail view of the ribbon feeding mechanism detached from the rest of the apparatus and viewed as indicated by the arrows from the line 7—7 of Fig. 4ª.

Underneath the line of hammers is arranged a brass plate, 51, making a slight angle to the axis of the drum, and provided with a slot, 52, passing beneath the operative ends of the hammers, and inclined in relation to the plate itself. Over this plate passes an inked ribbon, 53, which is drawn by mechanism to be explained hereinafter from the roller, 54, and wound on to the roller, 55, the ribbon passing at a slight angle to the axis of the drum, and therefore corresponding in position with the brass plate, the object of this disposition of parts being to utilize the full breadth of the ribbon. To feed the ribbon forward the receiving roller, 55, is provided with a spur wheel, 56, gearing with a second spur wheel, 57, carrying a ratchet wheel, 58, rigidly attached thereto. A spring pressed pawl, 59, carried on the end of a double lever, 60, is arranged in operative relationship to the ratchet wheel, the other end of the double lever being connected by way of the link, 61, bell-crank, 62, and slotted lever 63, to the hinged door, 64, of the casing inclosing the instrument. By means of the mechanism described, the ribbon is thus automatically fed forward once a day when in the usual course the case is opened to remove that portion of the chart corresponding to a day's work.

Figure 9:
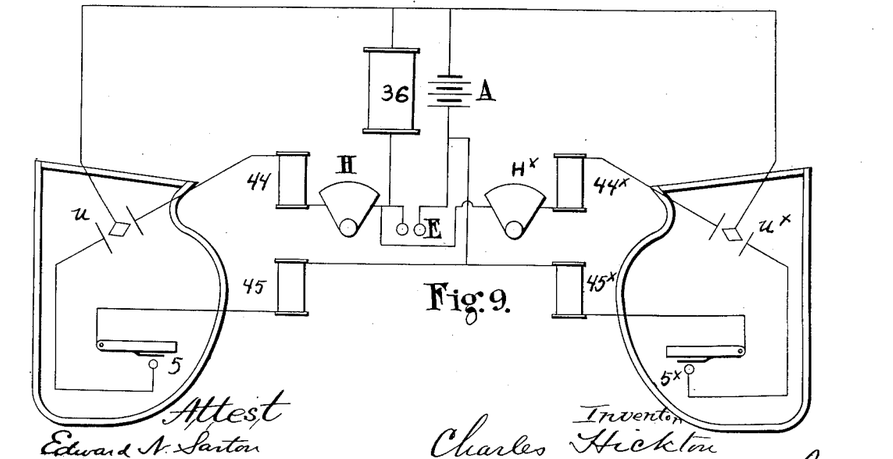
Fig. 9 shows a diagrammatic view of the electrical connections for a recording instrument for two machines.

Suitable terminals are arranged on the base on which the instrument is mounted for making the necessary electrical connections, such connections being shown in full in Fig. 9. Referring to this figure, the battery, A, which operates both the drum driving magnet, 36, and the hammer magnets, 44 and 45, for a number of different lace making machines is included in a circuit with the drum driving magnet, 36, and the controlling clock, E, which may be of any suitable or well known form adapted to intermittently close the circuit. In shunt with this circuit is a second circuit passing by way of the switch, u, in the casing of the measuring mechanism, and thence by way of one of the hammer magnets, 44, and the belt lever switch, H, a second circuit passing by way of the switches, u and 5, in the measuring mechanism casing and the magnet, 45. Connections are also shown for a second pair of magnets and the switches corresponding to a second lace making machine, but it will be evident that the number of machines for which a recording instrument is used may be extended as required; the magnets, switch and so forth in connection with this second machine are indicated by the same symbols as before with the addition of a cross.

I will now describe the action of the complete installation with reference to one particular lace making machine. The switch u, in the casing of the measuring mechanism will normally be closed, and if the lace making machine is running the belt lever switch will also be closed, and at each closing of the circuit by the clock a current will pass from the battery through the energizing coils of the magnet, 44, and will operate the hammer, 42. At the same time each closing of the circuit by the clock sends a current from the battery through the drum driving magnet thereby intermittently rotating the drum. The effect of the slow rotation of the drum and the rapidly repeated action of the hammer, will be in effect to draw a line on the chart so long as the lace making machine in question is running. If the machine is not running the belt lever switch will be open, and no current can pass to the hammer magnet. The chart being ruled or otherwise graduated on a time basis the running and idle time of the machine can at once be ascertained by inspection of the record. As the ratchet wheels of the measuring mechanism rotate and on the completion of each rack the pin on the second ratchet wheel will operate the tumbler in the manner before described, thereby momentarily sending a current from the battery by way of the switch, u, the switch, 5, and the energizing coil, 45, of the rack recording magnet, 43, which will thereupon be operated and make a mark on the chart recording the completion of a rack of work.

The recording instrument is placed in a suitable office and locked up so that it cannot be tampered with. A continuous record of the working of the machines in the factory can thus be contained on one sheet, so giving a proper check on the workers.

It will be evident that many variations can be made from the particular embodiment of my invention which has been described in detail above.

Having now described my invention what I claim as new and desire to secure by Letters Patent is:—

1. In combination with a lace making or other textile machine an apparatus consisting in a clock-driven recording drum, a lever switch adapted to be closed when the machine is running and to be open when the machine is stopped, a clock controlled make-and-break device in circuit with said switch, an output recording instrument whereby the amount of work completed by, and the idle and running time of one or more machines are simultaneously recorded.

2. In a machine-output indicating device, a record-receiving element; a record-maker co-acting therewith; electrically operated means for actuating said record-maker and in circuit with said actuating means a clock-controlled make-and-break and a switch controlling said circuit, said switch being adapted to be closed when the machine is running and vice versa.

3. In a machine output indicating device, a train of measuring wheels one of which is graduated to indicate output and positionable to a given graduation independently of the other wheels; a casing inclosing certain of said wheels, said casing having a close-fitting opening through which said graduated wheel projects; a record-receiving element; a record-maker disposed in operative relationship to said record-receiving element and means actuated by one of said inclosed wheels for operating said record-maker.

4. In a machine output indicating device, a record-receiving element, time and output record makers co-acting therewith, electro-magnetic means for actuating said record makers and a combined starting lever and switch for starting the machine and rendering operative both of said actuating means.

5. In a machine-output indicating device, a train of measuring wheels; time and output record-makers; means for operating said output record-maker from one of said measuring wheels; and electrically operated means for actuating said time record-maker and in circuit therewith a clock-controlled make-and-break.

6. In a machine-output indicating device, time and output record-makers; electrically operated means for actuating the same said means being on separate circuits, and a two-way switch for determining which of said means shall operate.

7. In a machine-output indicating device, time and output record-makers; actuators therefor; record-receiving means and means for moving the same relatively to said record-makers together with a single source of electrical energy for operating said actuators and moving said record-receiving means.

8. In a machine-output indicating device, a train of measuring wheels; a record-receiving element and a record-maker co-acting therewith; electrically operated means for operating said record-maker; a pair of switches in series controlling said operating means and means actuated by one of said measuring wheels for first closing one of said switches and while closed momentarily closing the other of said switches.

9. In a machine-output indicating device, a train of measuring wheels; a record-maker and electrically operated means for actuating the same; a pair of switches in series controlling said actuating means, one of said switches including a trip tumbler member and a pin on one of said wheels for tripping said tumbler member.

10. In a machine-output indicating device; record-receiving means; time and output record-makers co-acting therewith; and means for operating the same including electromagnets having a common armature.

11. In a machine-output indicating device, record-receiving means; time and output record-makers co-acting therewith, and electro-magnetic means for operating one only of said record-makers for a machine at a given moment.

12. In a machine-output indicating device, record-receiving means; time and output record-makers co-acting therewith; electromagnets in shunt; a common armature for operating said record-makers and a two-way switch controlling said electromagnets.

13. In a machine-output indicating device, record-receiving means; a record-maker co-acting therewith; means for actuating said record-maker; means for rendering operative said actuating means, and an instrumentality for starting said machine, said instrumentality and said rendering operative means being in operative relationship.

14. In a machine-output indicating device, record-receiving means; a record-maker co-acting therewith; electrically operated means for actuating said record-maker; a switch controlling said electrically operated means and a single instrumentality for starting said machine and closing said switch.

15. In a machine-output indicating device, record-receiving means; record-making means co-acting therewith, said means including a ribbon; a casing and a door therefor; together with means for automatically feeding said ribbon on operation of said door.

16. In a machine-output indicating device, a record-receiver; a plurality of alined markers co-acting therewith and a ribbon angled to said alined markers, and disposed between the same and said record-receiver.

17. In a machine-output indicating device, a record-receiver; a plurality of markers co-acting therewith; and a superposed ribbon and plate disposed between said markers and said record-receiver, said plate being apertured to correspond with said markers.

18. In a machine-output indicating device, a record-receiver; a plurality of alined markers co-acting therewith; and a superposed ribbon and plate angled to said alined markers, said plate having an aperture corresponding with said alined markers.

19. In a machine-output indicating device, a record-receiver; a plurality of alined markers co-acting therewith, and a ribbon angled to said alined markers to an extent dependent on the ratio of the breadth of said ribbon to the length of the line of markers.

20. In a machine-output indicating device, side frames; record-receiving means; a roll pivoted to and between said frames, said roll having means for engaging said record-receiving means; means for driving said roll and time and output markers for a plurality of machines, said time and output markers having their operative ends alternately arranged and alined in operative relationship to said roll.

21. In combination a clock-driven recording drum, a lever switch adapted to be closed when the machine is running and to be open when the machine is stopped, a clock controlled make-and-break device in circuit with said switch, means for sending a momentary current of electricity on the completion of a definite amount of work, a recording instrument actuated by said current whereby the amount of work completed by, and the idle and running time of one or more machines are simultaneously recorded.

22. In a machine-output indicating device an outer casing, a door in said casing, a recording drum placed within said casing, a chart and ribbon moving over said drum, said ribbon being automatically fed by the operation of the casing door, an automatic time and output recording means whereby the work done by, and the idle and running time of one or more machines are recorded simultaneously.

23. In a machine-output indicating device, a common source of electrical energy, a clock driven recording drum, a system of magnets, markers operated by said magnets, means for closing an electrical circuit on the starting of one or more machines and for opening said circuit on the stopping of the same, a clock controlled make-and-break device, whereby the idle and running time of one or more machines is recorded together with means for momentarily closing another circuit on the completion of a definite amount of work, whereby said magnets become energized from the common source and actuate the markers which record simultaneously the amount of work completed by one or more machines.

24. In combination a casing a clock driven recording drum, a chart thereon, a ribbon and ribbon-carrier, said ribbon being fed automatically by operation of the door of said casing, a source of electrical energy, magnets excited from said source markers operated by said magnets, a switch adapted to close when the machine is running and vice versa, a clock controlled make-and-break contact in circuit with said switch whereby the idle and running time is recorded on the drum by the markers, means for simultaneously recording the output of said machines.

25. In combination a means for recording the idle and running time of one or more machines, together with a measuring wheel and pin driven by the machine, a tumbler lever and a plurality of switches electrically connected, a system of magnets arranged in pairs, an armature carried by each pair of said magnets, two hammers or markers mounted on each armature, a source of electrical energy exciting said magnets, a recording drum driven from said source, whereby on the completion of a definite amount of work the said measuring pin completes an electric circuit causing the magnets to become energized thus operating the markers which record on the chart the work done.

26. In combination a casing, a door on said casing, a single source of electrical energy a clock driven recording drum, a chart and ribbon thereon, said ribbon being automatically fed by the operation of the casing door a plate supporting said ribbon and inclined at an angle to the drum axis, a system of magnets energized from said source, markers operated by said magnets, a slot in said ribbon supporting plate corresponding with the position of the markers, a clock controlled make-and-break, a switch in circuit with the source, make-and-break and magnets; said switch being adapted to close the electric circuit when the machine is running whereby the time of running is recorded on the recording drum by said markers, a measuring wheel and pin driven by the machine, a tumbler lever and a plurality of electrically connected switches and contacts, a system of magnets energized by the common source each pair being connected in parallel, an armature carried by each pair of magnets, two markers and hammers carried by each of said armatures, whereby on the completion of a definite amount of work the measuring pin completes another electric circuit the momentary current caused therein energizing the magnets and causing the markers to record on the chart the work done.

In testimony whereof, I affix my signature in presence of two witnesses.

CHARLES HICKTON.

Witnesses:
R. W. ASHTON POTTER,
T. B. COX.